(12) United States Patent
Tsai

(10) Patent No.: US 8,121,334 B2
(45) Date of Patent: Feb. 21, 2012

(54) BLUETOOTH EARPHONE HAVING SEMI-AUTOMATIC RECEIVING FUNCTION

(75) Inventor: Tse-Ming Tsai, Sindian (TW)

(73) Assignee: Cal-Comp Electronics & Communications Company Limited, Taipei County (TW)

( * ) Notice: Subject to any disclaimer, the term of this patent is extended or adjusted under 35 U.S.C. 154(b) by 1282 days.

(21) Appl. No.: 11/812,269

(22) Filed: Jun. 18, 2007

(65) Prior Publication Data

US 2008/0310656 A1    Dec. 18, 2008

(51) Int. Cl.
*H04R 25/00*    (2006.01)

(52) U.S. Cl. ........ 381/374; 381/376; 381/379; 381/380; 381/383; 381/395

(58) Field of Classification Search .................. 381/374, 381/376, 379, 380, 383, 395
See application file for complete search history.

(56) References Cited

U.S. PATENT DOCUMENTS

| | | | | |
|---|---|---|---|---|
| 5,881,149 | A * | 3/1999 | Weatherill | 379/433.02 |
| 7,844,311 | B2 * | 11/2010 | Kim | 455/575.1 |
| 2001/0036266 | A1 * | 11/2001 | Gronroos et al. | 379/433.01 |
| 2002/0016191 | A1 * | 2/2002 | Ijas et al. | 455/575 |
| 2003/0050092 | A1 * | 3/2003 | Yun | 455/556 |
| 2003/0060241 | A1 * | 3/2003 | Loprete | 455/568 |
| 2005/0089186 | A1 * | 4/2005 | Kulas | 381/384 |
| 2006/0034451 | A1 * | 2/2006 | Ijas et al. | 379/433.13 |
| 2008/0298626 | A1 * | 12/2008 | Dean | 381/381 |
| 2008/0310656 | A1 * | 12/2008 | Tsai | 381/151 |
| 2009/0069060 | A1 * | 3/2009 | Kim | 455/575.6 |
| 2009/0197576 | A1 * | 8/2009 | Kulas | 455/412.1 |
| 2009/0197649 | A1 * | 8/2009 | Ranney | 455/569.1 |
| 2009/0197650 | A1 * | 8/2009 | Kulas | 455/569.1 |
| 2009/0318085 | A1 * | 12/2009 | Seshadri et al. | 455/41.3 |
| 2010/0104125 | A1 * | 4/2010 | Neu et al. | 381/381 |
| 2011/0098112 | A1 * | 4/2011 | LeBoeuf et al. | 463/31 |

* cited by examiner

*Primary Examiner* — David S. Warren

(74) *Attorney, Agent, or Firm* — Rosenberg, Klein & Lee

(57) ABSTRACT

A Bluetooth earphone having a semi-automatic receiving function includes a housing, an earphone, a first flexible portion, a button, and a fastening mechanism. The housing has a receiving slot. The earphone is pivoted with the housing and received in the receiving slot that can be rotated to the outside of the housing. The first flexible portion located between the housing and the earphone provides a force to eject the earphone. The button is located on the housing and connected with the earphone. The fastening mechanism is located between the button and the housing to fasten the earphone in the receiving slot. The user presses the button to eject the earphone by utilizing the flexible force of the first flexible portion. Thereby, the earphone can be received in the housing to prevent the earphone from being broken due to the impacts of external forces.

11 Claims, 8 Drawing Sheets

BLUETOOTH EARPHONE HAVING SEMI-AUTOMATIC RECEIVING FUNCTION

BACKGROUND OF THE INVENTION

1. Field of the Invention

The present invention relates to a Bluetooth earphone having a semi-automatic receiving function. In particular, this invention relates to a Bluetooth earphone that receives the earphone in the body to prevent the earphone from being broken due to the impacts of external forces.

2. Description of the Related Art

Portable electronic communication devices that do not need to be held (such as wireless earphones) usually include an earphone and a microphone for receiving and transmitting voice data. In order to satisfy the requirements of users, allowing communication at anytime and anywhere, as well as providing excellent communication, the earphone is usually plugged into the ear of the user.

Because the portable characteristics of wireless earphones are their key selling point, the structure of a wireless earphone is usually light and thin, and strength is disregarded. Of course, the wireless earphone has to satisfy the characteristics of being handy and durable. Therefore, when a user is not using the wireless earphone, the wireless earphone can be placed into a pocket, a handbag, or a drawer etc, and bears a degree of external force caused by its users or its environment so that its structure is still intact.

FIG. 1 shows a wireless earphone of the prior art. The wireless earphone includes a housing 1a, an earphone 2a, and a microphone 3a. The housing 1a is rectangular and arced. At one end of the earphone 2a, there is an amplifier 21a. The earphone 2a protrudes from one side of the housing 1a. The amplifier 21a of the earphone 2a is placed into the ear of the user to receive sounds clearly. In the housing 1a, there is a Bluetooth wireless receiving and sending device (not shown in the figure). Therefore, voice signals of the portable electronic device (such as a cell phone) can be transmitted. The microphone 3a is located at an end of the housing 1a that is far away from the earphone 2a that is a sending port for receiving the user's voice.

However, the wireless earphone of the prior art has a problem in that the earphone 2a can be easily broken. Because the earphone 2a protrudes from one side of the housing 1a, the connection point of the earphone 2a and the housing 1a (the torque is maximum) will be broken when an external force is exerted upon it. Therefore, the user cannot place the wireless earphone arbitrarily. It is inconvenient for the user.

The portable wireless earphone has to overcome challenges from its users and its environment. However, the wireless earphone of the prior art cannot overcome these problems.

SUMMARY OF THE INVENTION

One particular aspect of the present invention is to provide a Bluetooth earphone having a semi-automatic receiving function. When the user is not using the Bluetooth earphone, the user can place the wireless earphone arbitrarily. The problem of the earphone being broken due to the impacts of external forces is solved.

The Bluetooth earphone having a semi-automatic receiving function includes a housing having an earpiece receiving bay arranged thereon, an earpiece pivotally coupled to the housing and retractable into the earpiece receiving bay, wherein the earpiece is selectably retained between a retracted position and a deployed position, a first flexible member urgingly arranged between the housing and the earpiece for providing a force to eject the earpiece, a button operably arranged on the housing and connected to the earpiece, and a retaining mechanism located between the button and the housing to fasten the earpiece in the earpiece receiving bay.

The present invention has the following characteristics. The Bluetooth earphone of the present invention has a semi-automatic receiving function. When the user wishes to use the earphone, the user presses the button to utilize a force provided from the first flexible portion to expose the earphone. When the user is not using the earphone, the earphone is received in the receiving slot. The problem of the earphone being broken due to the impacts of external forces is avoided. When the user is not using the Bluetooth earphone, the user can place the wireless earphone arbitrarily. It prevents the Bluetooth earphone from being damaged, and it is convenient for the user to carry around.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
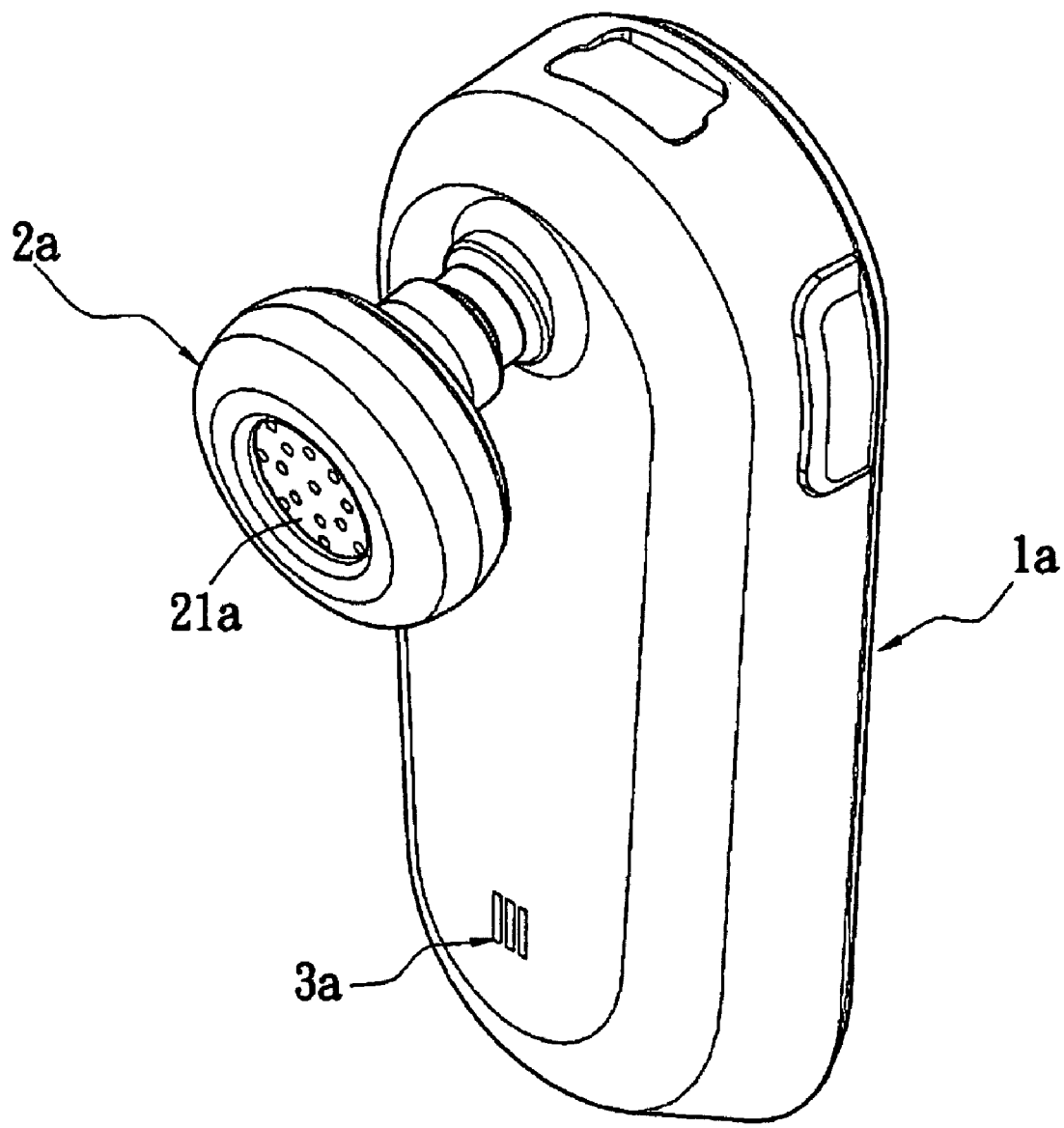
FIG. 1 is a perspective view of the earphone of the prior art.
Figure 2:
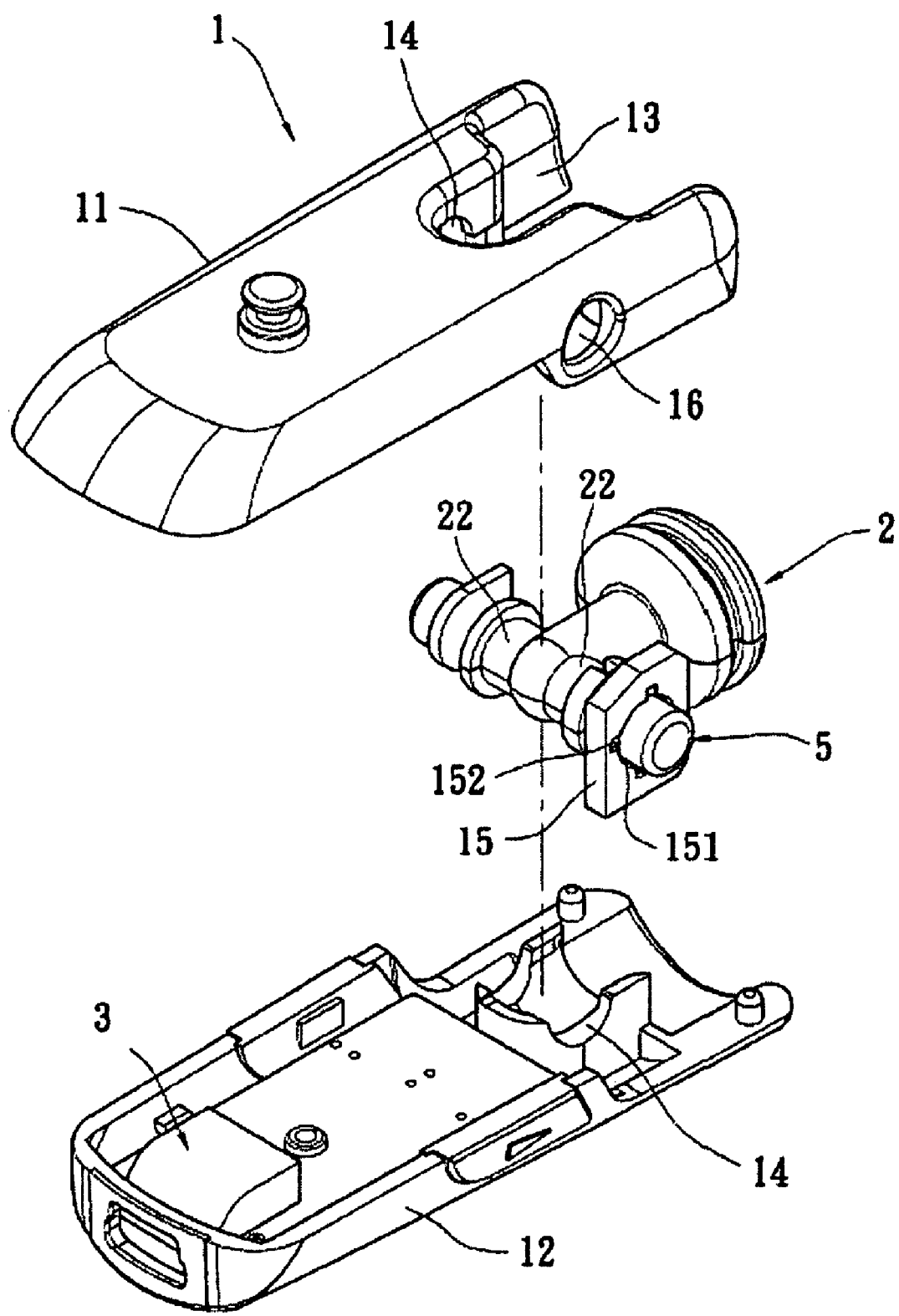
FIG. 2 is an exploded perspective view of the earphone of the present invention.
Figure 3:
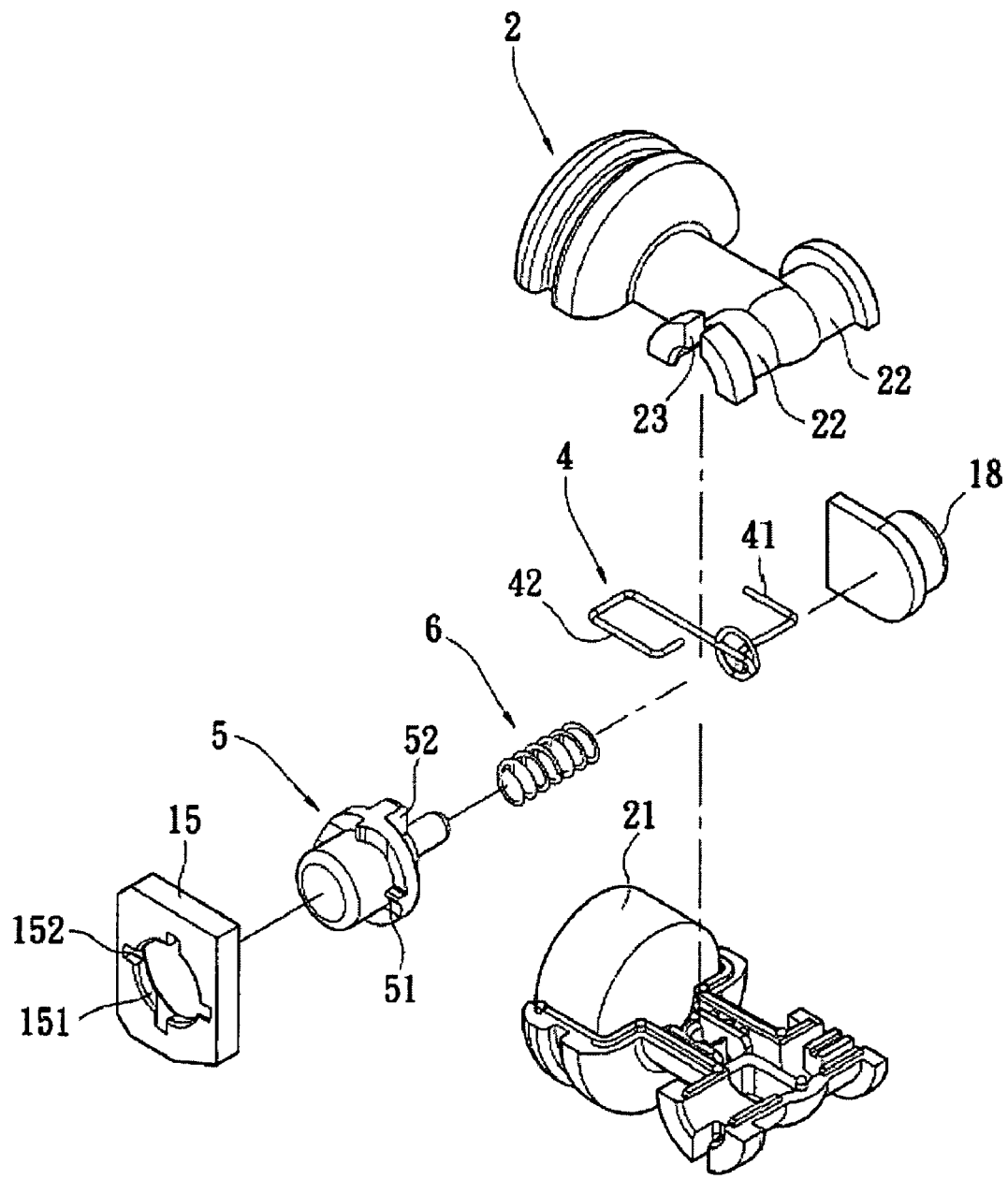
FIG. 3 is an exploded perspective view of some of the components of the earphone of the present invention.
Figure 4:
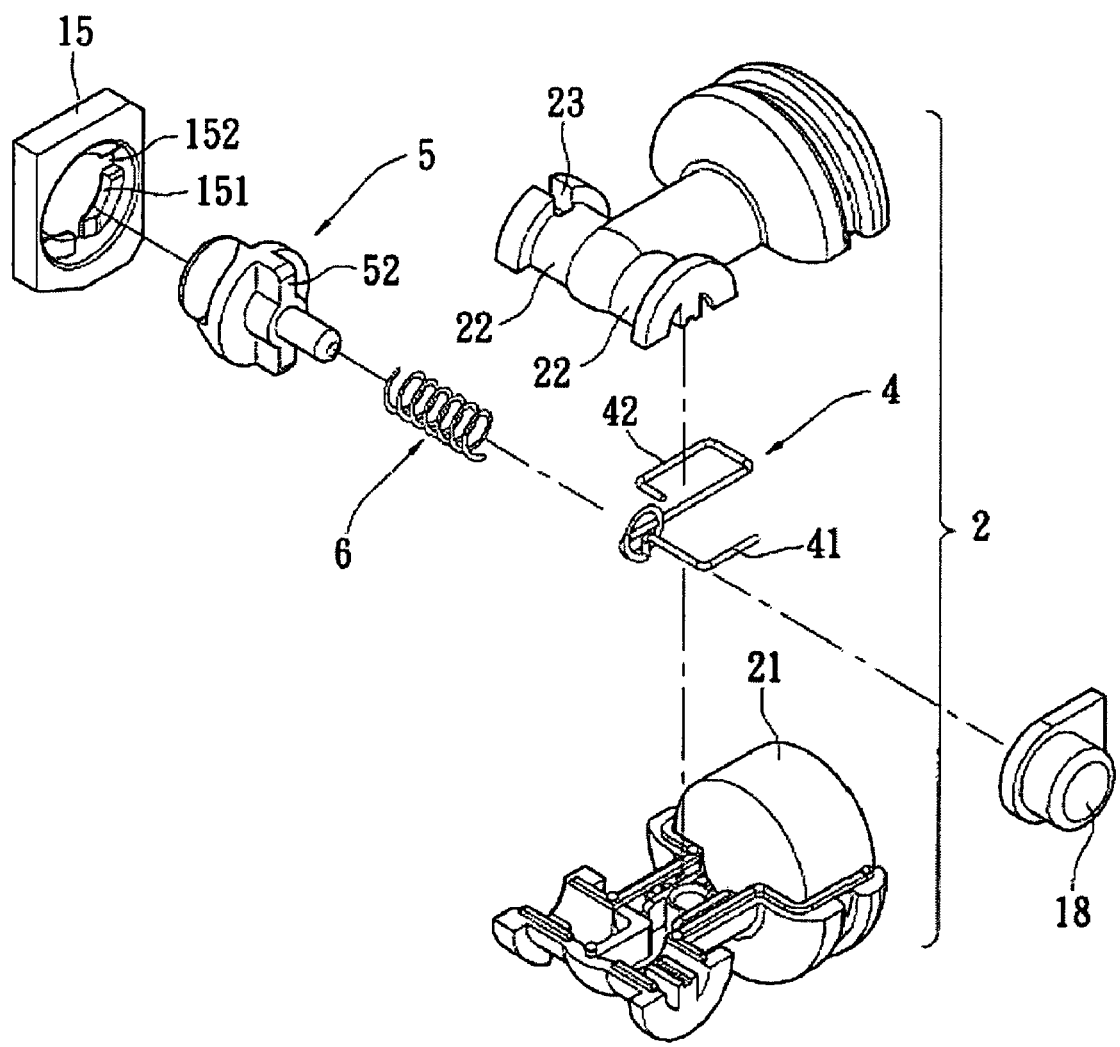
FIG. 4 is another exploded perspective view of part of components of the earphone of the present invention.
Figure 5:
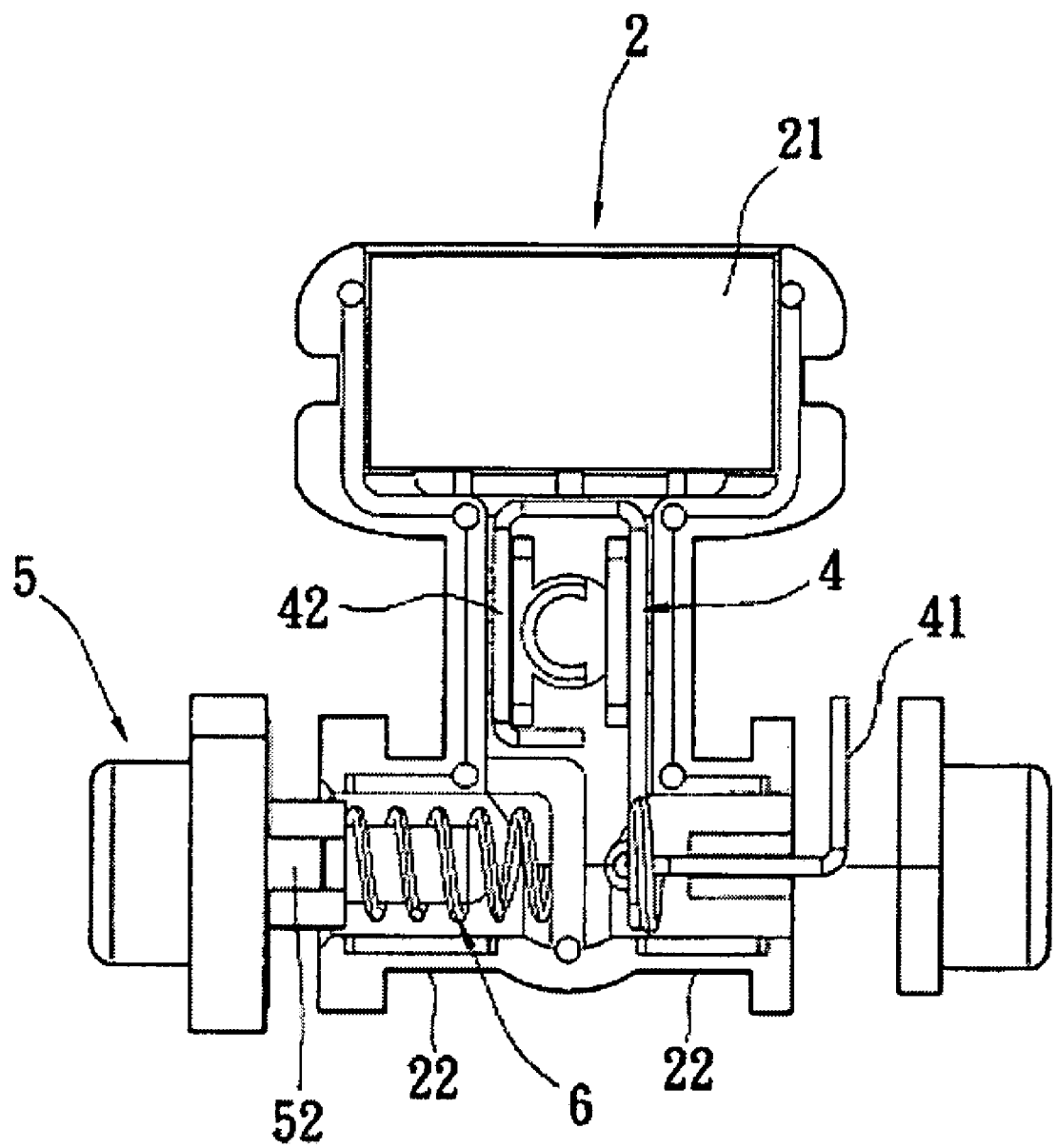
FIG. 5 is a cross-sectional view of part of components of the earphone of the present invention.
Figure 6:
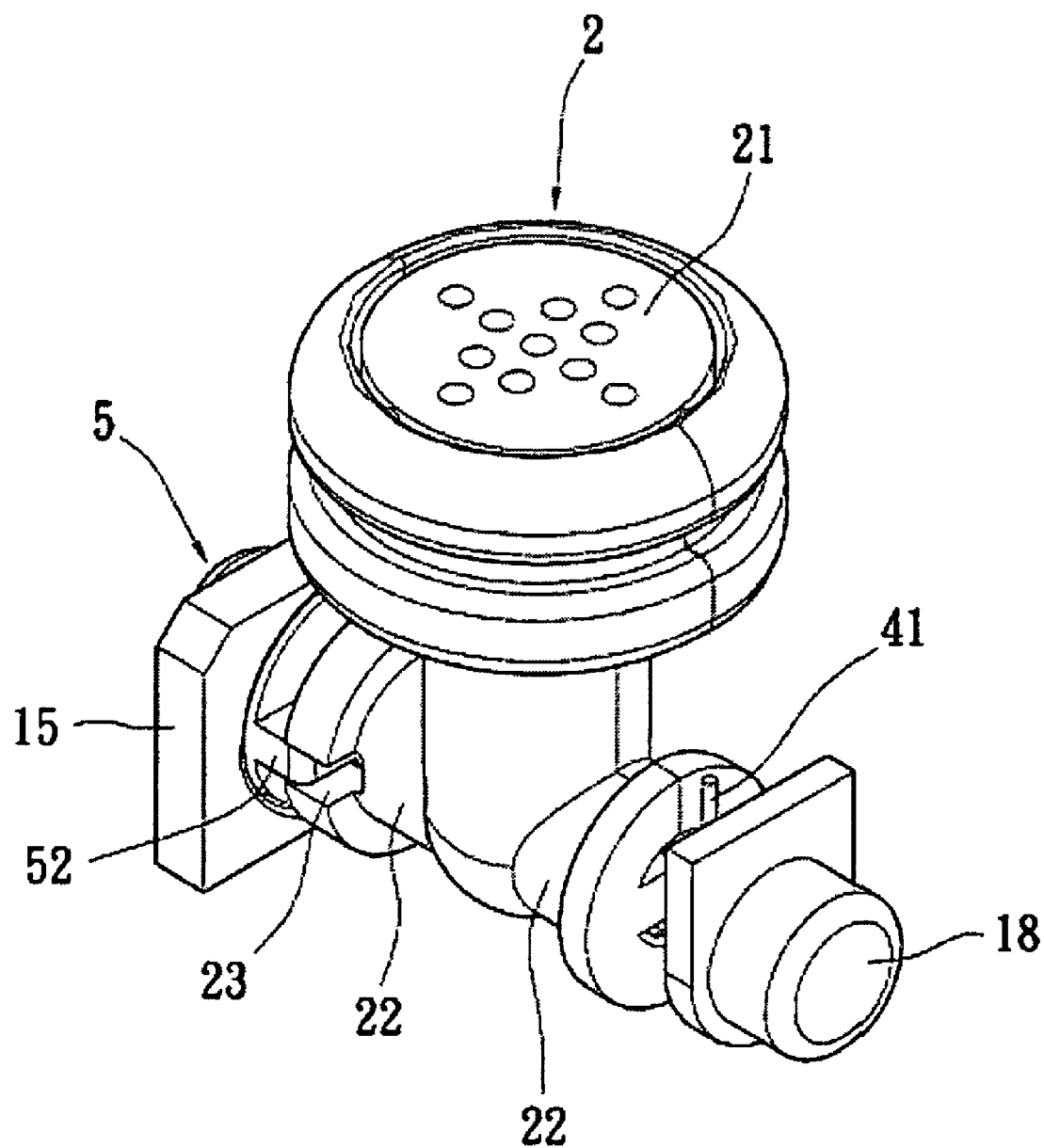
FIG. 6 is a perspective view of part of components of the earphone of the present invention.

Reference is made to FIGS. 2~8. The Bluetooth earphone having a semi-automatic receiving function includes a housing 1, an earphone 2, a microphone 3, a first flexible portion 4, a button 5, and a second flexible portion 6. The housing 1 is rectangular. The housing 1 includes a first semi-shell 11 and a second semi-shell 12. The first semi-shell 11 and the second semi-shell 12 are assembled together by using a wedged method, a screwing method, or a supersonic method to form the housing 1.

One end of the housing 1 has an earpiece receiving bay 13 arranged thereon. One end of the housing 1 indents to form the earpiece receiving bay 13 and the earpiece receiving bay 13 has a rectangular opening space. The dimensions of the earpiece receiving bay 13 allow it to receive the earpiece 2. Two side surfaces of the earpiece receiving bay 13 that are adjacent to the bottom of the earpiece receiving bay 13 have a pair of circular pivoting holes 14. There is a button base 15 in the housing 1, and the button base 15 is adjacent to the earpiece receiving bay 13. There is an assembling hole 151 on the button base 15. There are four wedged slots 152 on the inner wall of the assembling hole 151. The wedged slots 152 are disposed at an interval with 90 degrees.

The microphone 3 is located in the housing 1. The microphone 3 is located at one end of the housing 1 that is far away from the receiving slot 13 and is used as a sending port. The microphone 3 is close to the user's mouth to receive the user's voice. There is a Bluetooth wireless communication device (not shown in the Figures) in the housing 1. The Bluetooth wireless communication device is electrically connected with the earphone 2 and the microphone 3 in the housing 1 to perform a sound signal transmission with a portable wireless communication device (such as a cell phone).

The earpiece 2 is located in the earpiece receiving bay 13. One end of the earpiece 2 has a speaker 21. When the earpiece 2 is being used, the speaker 21 is extended into the ear of the user. A second end of the earpiece 2 that is far away from the speaker 21 has a pair of pivoting shafts 22. The pair of pivoting shafts 22 extends from two opposite locations on the surface of the earpiece 2. The shape of the pivoting shafts 22 is a circular column that corresponds to the pivoting hole 14 of the earpiece receiving bay 13. The two pivoting shafts 22 of the earpiece 2 are pivotally coupled in the pivoting holes 14 located on two sides of the earpiece receiving bay 13 and retractable into the earpiece receiving bay 13. Thereby, the earpiece 2 is selectably retained between a retracted position and a deployed position. The earpiece 2 is received in the earpiece receiving bay 13 and can be rotated to an outside of the earpiece receiving bay 13.

The first flexible member 4 is a twisted spring. The first flexible member 4 is formed by bending the flexible wire. The first flexible member 4 is urgingly arranged between the housing 1 and the earpiece 2. The first flexible member 4 has a first end portion 41 and a second end portion 42. The first end portion 41 and the second end portion 42 respectively contact the housing 1 and the earpiece 2 to provide a flexible force for the earpiece 2 so that the earpiece 2 can escape from the earpiece receiving bay 13 and be located at the using location.

The button 5 is used for controlling the earpiece 2 to eject. The button 5 is operably arranged at the assembling hole 151 of the button base 15 of the housing 1. The button 5 can move upwards and downwards on the button base 15. One side of the housing 1 has a through hole 16 so that one end of the button 5 passes through the through hole 16 so that it is exposed to an outside of the housing 1. Therefore, the button 5 can be pressed easily. The outer wall of the button 5 protrudes to form four wedged blocks 51. The wedged blocks 51 are disposed at an interval with 90 degrees. The wedged blocks 51 correspond to the wedged slots 152 to from a retaining mechanism.

The button 5 corresponds to one pivoting shaft 22 of the earphone 2. The key bodies 52 protrude from the button 5. Two key slots 23 are indented on the pivoting shaft 22 and correspond to the key bodies 52. The two key bodies 52 are movably plugged in the key slots 23 so that the button 5 is connected with the earphone 2 and both can be rotated synchronously. Another side of the housing has a second through hole 17. The second through hole 17 is installed with a decorating cover 18. The decorating cover 18 is opposite to the button 5 and merely provides a decorative function.

The second flexible portion 6 is located between the button 5 and the earphone 2. The second flexible portion 6 is a compressed spring. Two ends of the second flexible portion 6 respectively contact the earphone 2 and the button 5 to provide a recovery force for rising the button 5 and making the wedged block 51 of the button 5 be wedged within the wedged slot 152 so that the earphone 2 can be firmly fastened in the receiving slot 13.

Figure 7:
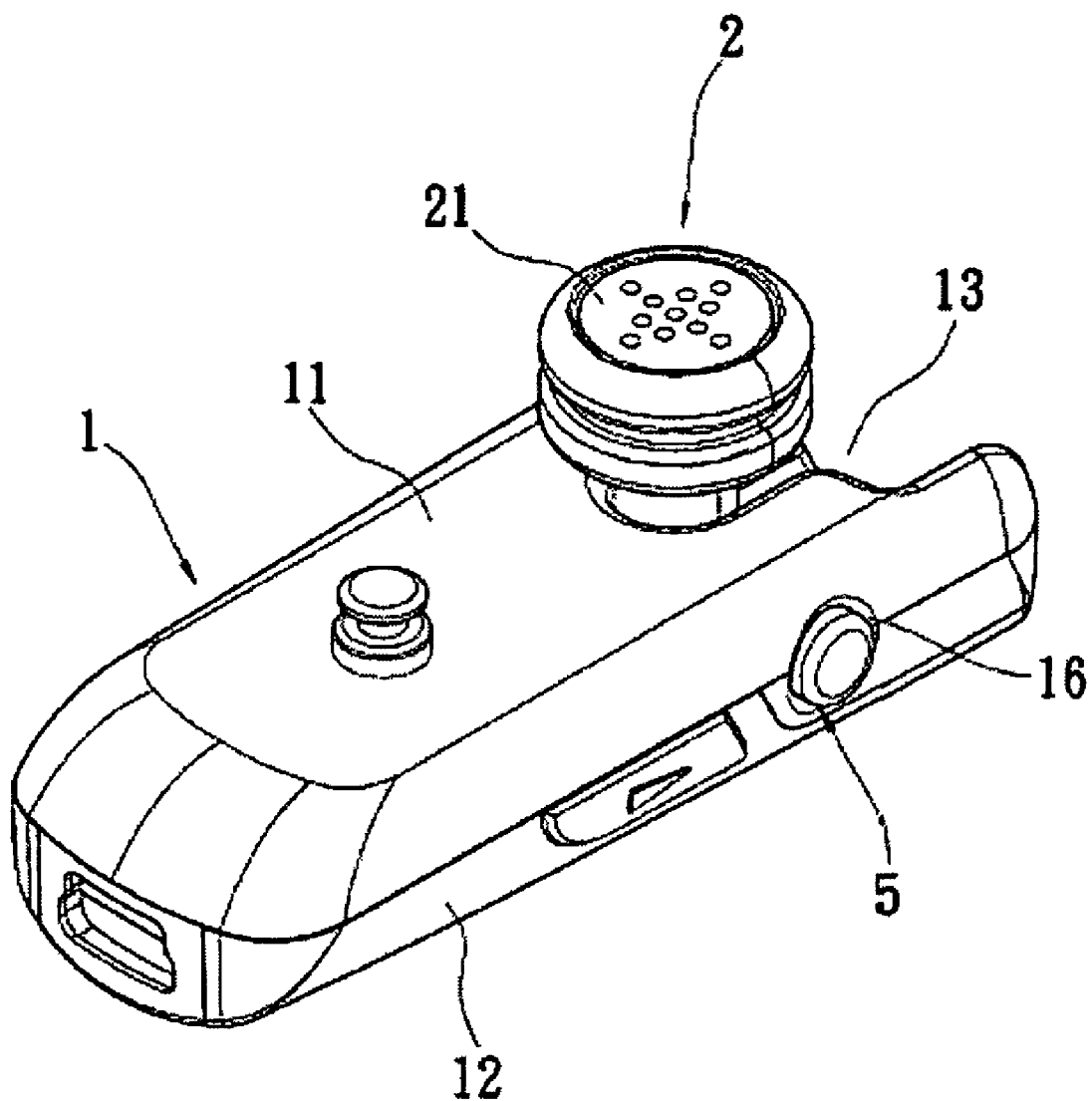
FIG. 7 is a perspective view of the earphone of the present invention being using.

When the user wishes to use the Bluetooth earphone, the user presses the button 5 to escape the wedged blocks 51 from the wedged slots 151 and release the earphone 2. The earphone 2 utilizes the twisted force of the first flexible portion 4 to eject the earphone to the using location (as shown in FIG. 7). Thereby, the earphone 2 protrudes from one side of the housing 1 and the speaker of the earphone 2 extends into the ear of the user, and the user can hear sounds clearly.

Figure 8:
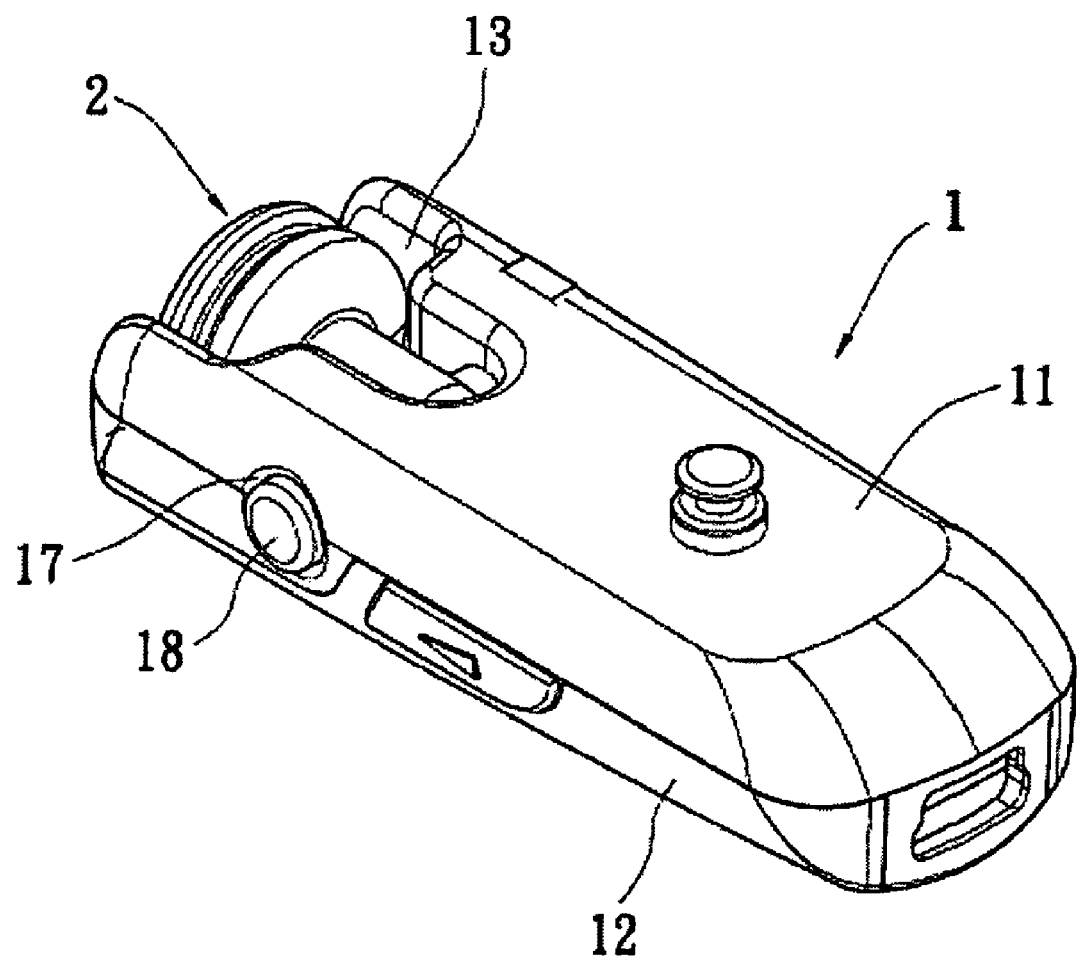
FIG. 8 is a perspective view of the earphone of the present invention being received.

When the user is not using the Bluetooth earphone, the earphone 2 is received in the receiving slot 13 (as shown in FIG. 8). By utilizing the receiving function, the wireless earphone can be placed in a pocket or a handbag. The problem of the earphone 2 protruding outside of the housing 1 and being broken due to the impacts of external forces is overcome.

The user can enclose or expose the earphone according to the user's operation requirement. When the user wishes to use the earphone, the user presses the button 5 to utilize the flexible force of the first flexible portion 4 to expose the earphone 2. When the user does not wish to use the earphone 2, the earphone 2 is received in the receiving slot 13. The problem of the earphone being broken due to the impacts of external forces is avoided. When the user is not using the Bluetooth earphone, the user can place the wireless earphone arbitrarily. It prevents the Bluetooth earphone from being damaged, and makes it convenient for the user to carry around.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A Bluetooth earphone having a semi-automatic receiving function, comprising:
   a housing having an earpiece receiving bay arranged thereon;
   an earpiece pivotally coupled to the housing and retractable into the earpiece receiving bay, wherein the earpiece is selectably retained between a retracted position and a deployed position;
   a first flexible member urgingly arranged between the housing and the earpiece for providing a force to eject the earpiece;
   a button operably arranged on the housing and connected to the earpiece; and
   a retaining mechanism located between the button and the housing to fasten the earpiece in the earpiece receiving bay.

2. The Bluetooth earphone having a semi-automatic receiving function as claimed in claim 1, wherein the receiving slot is formed by indenting inwards one end of the housing, a pair of pivoting holes are located in the receiving slot, the earphone has a pair of pivoting shafts, and the pair of pivoting shafts are pivoted in the pair of pivoting holes.

3. The Bluetooth earphone having a semi-automatic receiving function as claimed in claim 1, wherein the housing has a wireless communication device.

4. The Bluetooth earphone having a semi-automatic receiving function as claimed in claim 1, wherein a button base is located in the housing, the button base has an assembling hole, and the button is movably located in the assembling hole of the button base.

5. The Bluetooth earphone having a semi-automatic receiving function as claimed in claim 4, wherein there is a plurality of wedged slots on an inner wall of the assembling hole, an outer wall of the button protrudes to form a plurality of wedged blocks, and the wedged blocks correspond to the wedged slots to form the fastening mechanism.

6. The Bluetooth earphone having a semi-automatic receiving function as claimed in claim 5, wherein both the wedged slots and the wedged blocks are disposed at an interval with 90 degrees.

7. The Bluetooth earphone having a semi-automatic receiving function as claimed in claim 1, wherein the first flexible portion is a twisted spring, and the twisted spring contacts the housing and the earphone.

8. The Bluetooth earphone having a semi-automatic receiving function as claimed in claim 1, wherein there is a second flexible portion between the button and the earphone.

9. The Bluetooth earphone having a semi-automatic receiving function as claimed in claim 8, wherein the second flexible portion is a compressed spring, and the second flexible portion contacts the button and the earphone.

10. The Bluetooth earphone having a semi-automatic receiving function as claimed in claim 1, wherein the button has at least one key body, the earphone has at least one key slot, and the key body is movably plugged in the key slot.

11. A Bluetooth earphone having a semi-automatic receiving function, comprising:
- a housing having an earpiece receiving bay arranged thereon;
- an earpiece pivotally coupled to the housing and retractable into the earpiece receiving bay, wherein the earpiece is selectably retained between a retracted position and a deployed position;
- a first flexible member urgingly arranged between the housing and the earpiece for providing a force to eject the earpiece; and
- a button operably arranged on the housing, wherein the button is connected to the earpiece for controlling the earpiece to eject.

* * * * *